United States Patent [19]

Fiocco

[11] Patent Number: 4,588,563

[45] Date of Patent: May 13, 1986

[54] CASCADE SIEVE TRAY FOR EXTRACTION AND DEASPHALTING

[75] Inventor: Robert J. Fiocco, Summit, N.J.

[73] Assignee: Exxon Research and Engineering Co., Florham Park, N.J.

[21] Appl. No.: 570,668

[22] Filed: Jan. 13, 1984

[51] Int. Cl.⁴ .................. B01D 11/04; C01C 3/08
[52] U.S. Cl. .................. 422/256; 196/14.52; 210/532.1; 210/538
[58] Field of Search .................. 422/256; 196/14.52; 210/519, 522, 532.1, 538, DIG. 5

[56] References Cited

U.S. PATENT DOCUMENTS

| | | | |
|---|---|---|---|
| 2,153,507 | 4/1939 | Hann | 422/256 X |
| 2,768,071 | 10/1956 | Pokorny et al. | 422/256 |
| 2,777,758 | 1/1957 | Pokorny et al. | 422/256 |
| 3,632,315 | 1/1972 | Vitti et al. | 196/14.52 X |
| 3,899,299 | 8/1975 | Bushnell et al. | 422/256 |
| 4,336,106 | 6/1982 | Winter | 422/256 |
| 4,426,361 | 1/1984 | Bushnell | 422/256 |
| 4,511,537 | 4/1985 | Fiocco et al. | |

FOREIGN PATENT DOCUMENTS 0559262  6/1958  Canada .................. 422/256

Primary Examiner—Barry S. Richman
Assistant Examiner—Brion P. Heaney
Attorney, Agent, or Firm—Joseph J. Dvorak

[57] ABSTRACT

A liquid-liquid contacting apparatus of the type having at least two vertically spaced apart sieve tray assemblies includes vertical weirs between groups of sieve holes (preferably rows) in the sieve tray and, for each sieve tray located with the apparatus, a sloped collector-coalescer plate which provides a coalescence surface for dispersed phase droplets and directs the dispersed phase to the rows of sieve holes on the sieve trays. Additionally, the collector-coalescer plate prevents the dispersed phase droplets from impacting directly on the sieve holes where new drops of dispersed phase are being formed. This arrangement of sieve holes, weirs and collector-coalescer plate provides for steady controlled flow of dispersed phase throughout the apparatus over an exceptionally wide flow range and within a narrow, efficient fluid flow velocity through the sieve holes, e.g., a velocity of from about 0.6 to about 1.0 ft/sec.

5 Claims, 3 Drawing Figures

CASCADE SIEVE TRAY FOR EXTRACTION AND DEASPHALTING

FIELD OF THE INVENTION

This invention relates to contacting equipment useful in solvent extraction processes. More specifically, the invention relates to liquid-liquid contacting equipment using sieve tray internals which are capable of handling a wide range of dispersed phase flowrates.

BACKGROUND OF THE INVENTION

A variety of liquid-liquid extraction columns are known in the art. Illustrative of such extraction columns are those disclosed in the following U.S. patents: U.S. Pat. No. 2,710,790; U.S. Pat. No. 2,900,238; U.S. Pat. No. 2,988,429; U.S. Pat. No. 2,973,189; U.S. Pat. No. 2,895,809; U.S. Pat. No. 2,851,396; U.S. Pat. No. 2,153,507; U.S. Pat. No. 2,056,763; U.S. Pat. No. 1,992,133; U.S. Pat. No. 2,950,244 and U.S. Pat. No. 3,899,299. Of these liquid-liquid extraction devices, those employing sieve trays have gained considerable commercial acceptance since they are relatively inexpensive and function satisfactorily within design conditions. Unfortunately, liquid-liquid contact equipment using sieve tray internals, such as extraction towers or deasphalting towers, are not generally capable of efficiently handling a wide range of dispersed phase flowrates but are restricted to operating at the flowrate for which they were designed. The range of operability of the presently used contact equipment having sieve trays is limited since the flowrate of a liquid through a given sieve hole area is proportional to the square root of the head of the liquid being dispersed above or below the tray. Thus, to increase the flowrate by a factor of three for the same number of sieve holes, would require the ability to increase the head of liquid by a factor of nine. Moreover, the distribution of drop sizes formed would be adversely effected by the increased fluid velocity through the holes, resulting in reduced efficiency. Also, an equipment design which would accommodate such a change in head height and hole velocity is not economically attractive. Consequently, for this and other reasons, there remains a need for an improved liquid-liquid extraction apparatus which can handle a wide range of dispersed phase flowrates.

SUMMARY OF THE INVENTION

Accordingly, the present invention is directed to and provides an improved liquid-liquid extraction apparatus which has a capability of handling a wide range of dispersed phase flowrates. Briefly stated, according to the invention, a liquid-liquid contacting apparatus of the type having at least two vertically spaced apart sieve tray assemblies includes vertical weirs between groups of sieve holes (preferably rows) in the sieve tray and, for each sieve tray located within the apparatus, a sloped collector-coalescer plate which provides a coalescence surface for dispersed phase droplets and directs the dispersed phase to the rows of sieve holes on the sieve trays. Additionally, the collector-coalescer plate eliminates the need for a separate settling zone on the tray and prevents the dispersed phase droplets from impacting directly on the sieve holes where new drops of dispersed phase are being formed. This arrangement of sieve hole weirs and collector-coalescer plate provides for steady controlled flow of dispersed phase throughout the apparatus over an exceptionally wide flow range and within a narrow, efficient fluid flow velocity through the sieve holes, e.g., a velocity of from about 0.6 to about 1.0 Ft/sec.

BRIEF DESCRIPTION OF THE DRAWINGS

The invention will be more clearly understood from the accompanying drawings in which.

DETAILED DESCRIPTION OF THE INVENTION

Figure 1:
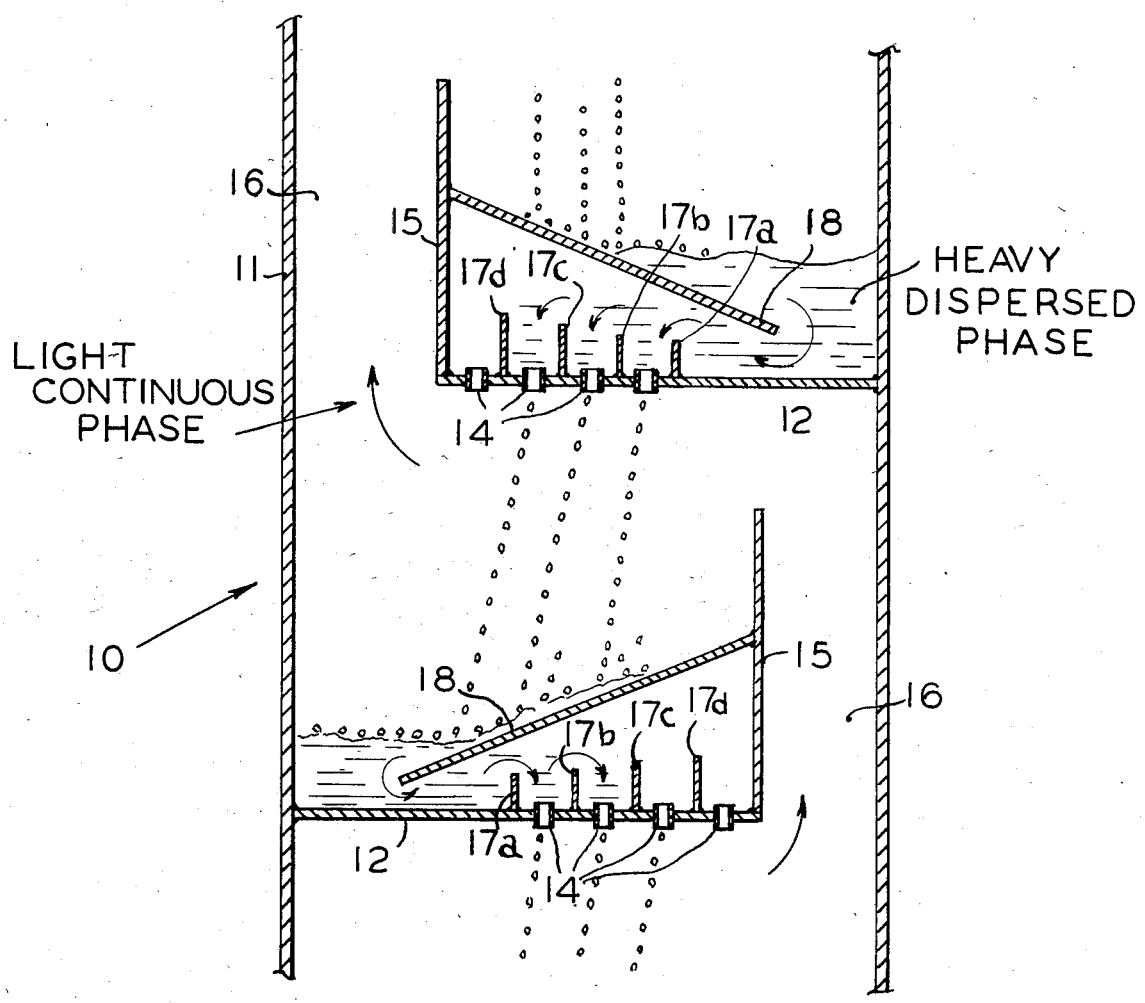
FIG. 1 is a sectional vertical elevation showing a single pass cascade sieve tray assembly in a liquid-liquid contact apparatus having vertical weirs between rows of sieve holes and a collector-coalescer plate in accordance with the present invention.

Referring to FIG. 1, there is illustrated a contact zone contained within a cylindrical extraction tower 10 having a vertical side wall 11. Located within the cylindrical tower 10 and vertically spaced apart are two horizontally disposed sieve tray assemblies. Each sieve tray assembly comprises a horizontally oriented plate 12 having a plurality of sieve holes 14 arranged in rows in the major area of plate 12 for the passage of heavy fluid down through the plate and a minor area on the plate 12 which is not perforated. Extending from tray 12 is a vertical plate segment 15 which together with the adjacent parallel wall portion 11 defines a conduit 16 through which a light continuous liquid phase passes as it progresses through the extraction tower when in use. Each plate 12 also is provided with an array of vertical weirs 17a–d between the rows of sieve holes 14. These weirs are in the direction of flow of the dispersed phase as it moves toward and ultimately through the sieve holes 14. The weirs may have the same height or optionally they may have different heights sufficient to prevent overshooting of the liquid when in use, in which event the weirs are arranged in successively increasing lengths in the direction of flow of the dispersed phase from the non-perforated area of plate 12 toward the sieve holes 14.

Also, as can be seen from FIG. 1 the sieve tray assemblies are so arranged with respect to each other that the conduit 16 of one tray assembly is non-aligned, or offset, with respect to the other thereby assuring that the light continuous phase proceeds in a tortuous path in its passage through the apparatus.

Finally, each sieve tray assembly is provided with a collector-coalescer plate 18 for collecting and coalescing dispersed phase droplets and directing the coalesced fluid to the non-perforated area of plate 12 and ultimately to sieve holes 14 in the plate 12. Basically, th collecter-coalescer plate 18 is inclined to direct the flow of the dispersed phase toward the non-perforated area of the sieve plate 12 and it extends for a sufficient distance so that the dispersed phase cannot impinge on the perforated section of the tray. Also, the collecter-coalescer plate 18 is spaced from the non-perforated area of the sieve plate 12 so as not to restrict the flow of dispersed phase underneath the collector-coalescer plate 18.

As should be readily appreciated, collecter-coalescer plate 18 eliminates the need for a major non-perforate portion on the sieve tray for separation and thus much smaller diameter towers may be used for the extraction process.

In the embodiment shown in FIG. 1, the collector-coalescer plate is located above the sieve tray 12 and extends downwardly from plate 15.

In operation, a light continuous phase material such as liquid propane is introduced into the bottom of the cylindrical extraction tower 10 and proceeds upwardly through conduits 16 to the top of the extractor where it is removed. A heavy phase, such as crude oil residua, is introduced in the top of the extractor, for example, through an inlet orifice which disperses the heavy phase in the light phase contained within the extractor. The heavy phase descends in countercurrent fashion to the light phase and impinges on collector-coalescer plate 18 where it is directed downwardly toward the sieve plate 12 and ultimately passes through the sieve holes 14 for further dispersion in the light phase below the sieve plate assemblies. In the lower sieve plate assembly, the collector-coalescer plate 18 again collects the dispersed phase and directs it downwardly and ultimately toward the sieve holes 14 in sieve tray 12 for further dispersion in the light phase below tray 12. The weirs, 17a–d, are substantially the same height and so separate the rows of holes 14 so that only the number of holes needed for the flow of dispersed phase liquid at optimum velocity through the holes are used, e.g., at velocities of from about 0.6 to about 1.0 ft/sec. If the dispersed phase flow rate is increased, the liquid will spill over another weir and more hole area will be utilized. Thus, the head of dispersed phase liquid is substantially constant, i.e., it is about the same as the height of the weir.

Figure 3:
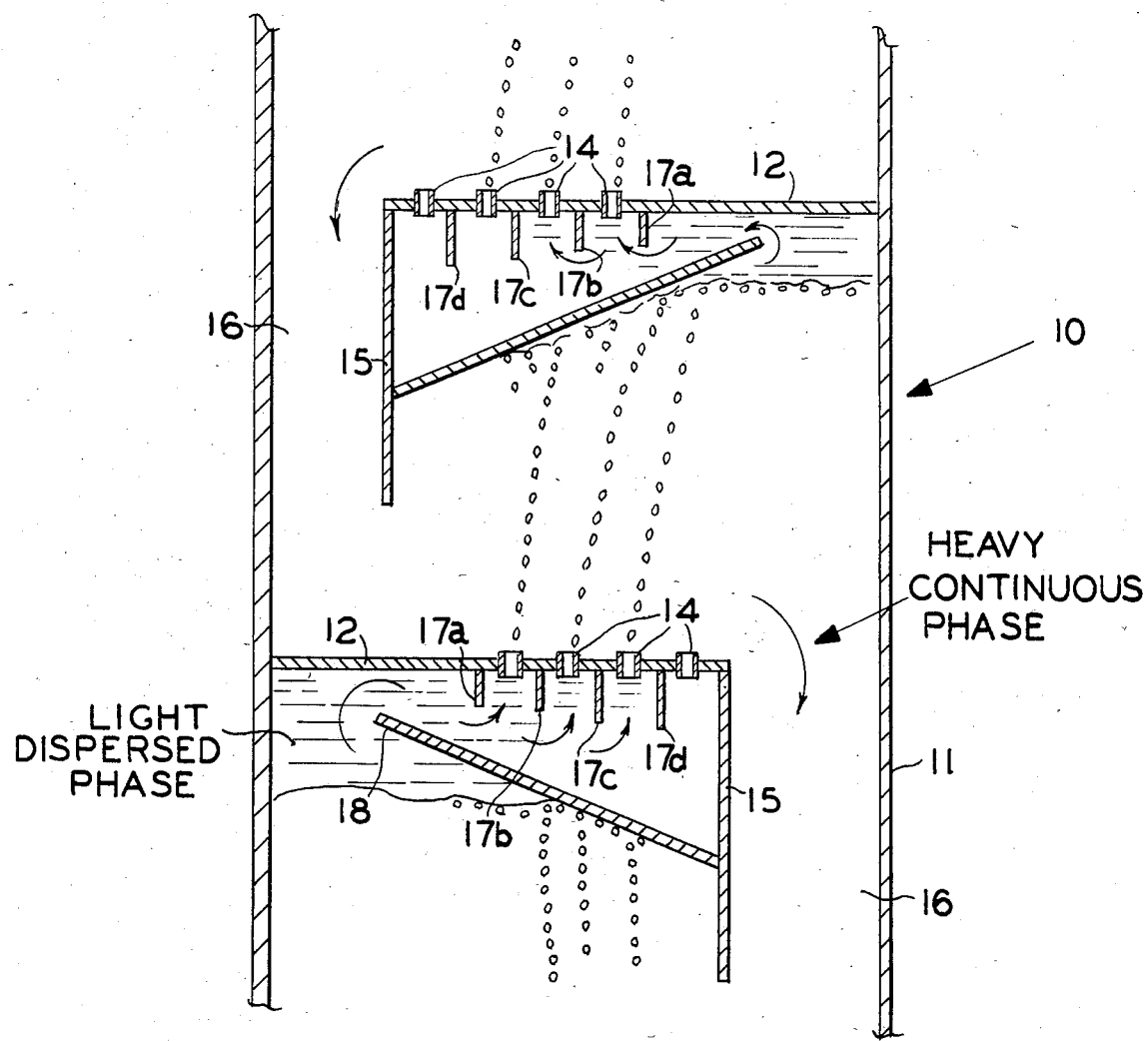
FIG. 3 is a sectional vertical elevation illustrating an embodiment identical to that of FIG. 1 except that the directions of flow for the dispersed and continuous phases are reversed.

FIG. 3 illustrates an embodiment similar to that of FIG. 1 except that a heavy continuous phase is introduced at the top of the tower and proceeds downwardly while a light dispersed phase, introduced at the bottom of the tower, proceeds upwardly.

Figure 2:
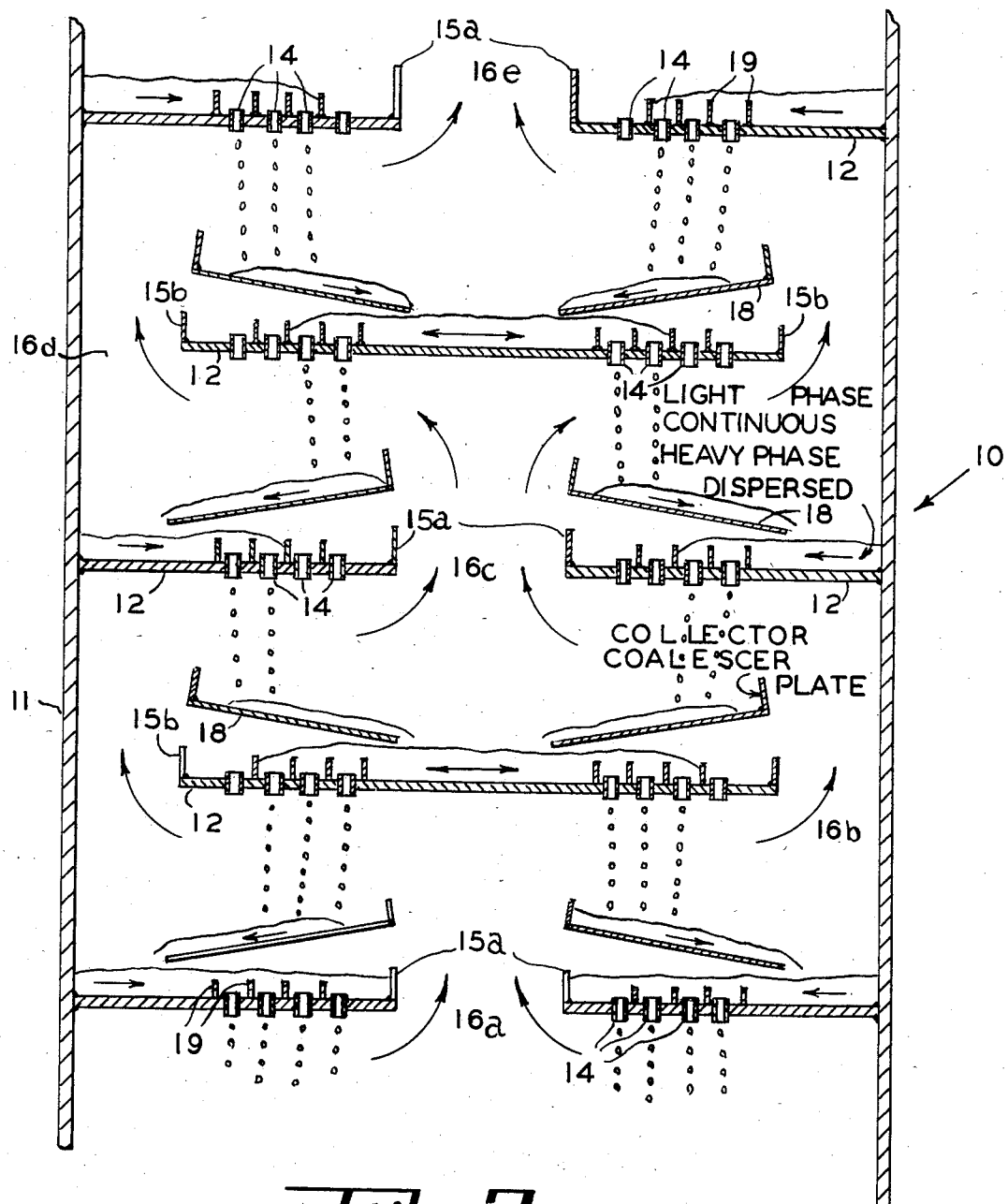
FIG. 2 is a sectional vertical elevation of a double pass sieve tray assembly employed in a liquid-liquid extraction apparatus, each sieve tray assembly having a collector-coalescer plate in accordance with the present invention.

Another embodiment of the present invention is shown in FIG. 2. In this embodiment, cylindrical extractor 10 has a plurality of sieve tray assemblies vertically spaced apart, one above the other. Each tray assembly comprises a horizontally oriented plate 12 having a plurality of sieve perforations or openings 14 in one area and a non-perforate area. Conduit means 16a–e are provided for the passage of continuous non-dispersed light phase through the extractor with each succeeding conduit means being offset or non-aligned with respect to the proceeding conduit to assure the liquid phase proceeds through a tortuous path during its passage through the extractor. Thus, as shown in FIG. 2 alternate plates 12 are provided with vertical plate segments 15a defining conduits 16a, 16c and 16e for the upward flow of non-dispersed fluid through the extractor 10. The remaining plates 12 have vertical end walls 15b which together with wall 11 of extractor 10 define other conduits 16b and 16d for the upward flow of fluid through the tower.

In the embodiment shown in FIG. 2 a number of overflow weirs 19 extend upwardly from the top of each sieve tray 12.

In accordance with the present invention, a collector-coalescer plate 18 is provided for each sieve tray assembly to collect dispersed phase, coalesce it and direct it toward the sieve openings in the tray for further dispersion and mixing with the continuous non-dispersed phase. Each tray 18 is located above a sieve tray assembly and inclined so as to direct the flow of collected-coalesced dispersed phase downwardly to the sieve tray 12 immediately below in a minor area substantially free of sieve openings. Indeed, in the embodiment shown in FIG. 2, these collector-coalescer plates 18 are generally sloped circular segments extending over the major perforate area of sieve tray 12.

An important advantage of the tray configuration described and claimed herein is that by segregating rows of sieve holes by means of weirs and using a collector-coalescer plate to direct the dispersed phase to the first row of holes, it is possible to operate at a very broad range of flowrates and still maintain a velocity of fluid through the sieve holes of about 0.6 to about 1.0 ft/sec. For example, if the heavy dispersed phase has a specific gravity of 1.08 and the continuous light phase, a specific gravity of 0.78, a ½ inch head would provide a velocity of 0.6 ft/sec through the holes and a 1⅜ inch head, a velocity of 1.0 ft/sec. Thus the height of the weirs are set at ½ inch to 1⅜ inches. Basing the total hole area on the highest design flowrate, say 250 gals/min, and the maximum velocity through the hole of about 1.0 ft/sec. a hole area of 0.557 $ft^2$ is required with a 1⅜ inch head of heavy phase liquid. The weirs which segregate the first row of sieve holes, however, are located, based on the minimum design flowrate, say 25 gals/min, at a velocity of about 0.6 ft/sec and a ½ inch head. These first vertical weirs then would be set to segregate this minimum hole area. The rest of the hole area is then segregated by plurality of weirs to provide intermediate predetermined flowrates. In general, the number of weirs employed would be sufficient to separate the rows of holes into equal hole areas substantially equivalent to the minimum calculated hole area.

In the preceding detailed description of the invention, the apparatus was described with particular reference to use in a liquid-liquid extraction where the continuous phase is a light phase and the dispersed phase is a heavy phase. It should be appreciated, however, that in the converse situation, i.e., where the continuous phase is the heavy phase and the discontinuous phase is the light phase, the sieve tray assemblies of the apparatus of the invention would be oriented 180 degrees from that shown in the figures. In other words, the vertical weirs extend downwardly from the trays and the collector-coalescer plate is disposed below each of the sieve trays and sloped upwardly towards a non-perforated area in the sieve tray.

Having thus described the invention, what is desired to be protected by Letters Patent is presented in the following appended claims.

What is claimed is:

1. In a vertical walled liquid-liquid contacting apparatus of the type having two ends opposite each other, first inlet means for the introduction of a first fluid located at one end of said apparatus for continuous flow of said first fluid through said apparatus, first outlet means located at the opposite end of said apparatus for removal of said first fluid, second inlet means for introduction of a second fluid for dispersed flow through said apparatus wherein said second inlet means is located at said opposite end of said apparatus, second outlet means for removal of said second fluid located at said one end of said apparatus at least two vertically spaced horizontal oriented sieve tray assemblies within said apparatus and including means for supporting said sieve tray assemblies in said apparatus, each sieve tray assembly includes a substantially horizontal sieve tray having a generally non-perforated first area and a second area with a plurality of perforations therein for allowing a flow of said second fluid therethrough whereby said second fluid is dispersed into droplets, and conduit means through each sieve tray assembly for flow therethrough of said first fluid, said sieve tray assemblies being positionioned in said apparatus such that said second areas of said sieve trays are substantially one above the other, the improvement comprising:

a plurality of vertical weirs attached to said second area of each said sieve tray separating groups of perforations having predetermined hole areas; and a collector-coalescer plate associated with each of said sieve trays, each said collector-coalescer plate having a first end and a second end and being disposed substantially transverse to the vertical axis of the apparatus and the axes of the perforations in said second area of its sieve tray associated therewith, each said collector-coalescer plate being rigidly supported therein by plate support means, each said collector-coalescer plate being sloped such that the first end thereof terminates in the region of, but spaced apart from said first area of its associated sieve tray, said first end of said collector-coalescer plate being closer to its associated sieve tray than said second end, each of said collector-coalescer plates being positioned so that under conditions of use said dispersed second fluid is collected and coalesced on each said collector-coalescer plate thereby forming a liquid stream which flows first towards said first area of its associated sieve tray, then between said sieve tray and said first end of said collector-coalescer plate, and ultimately toward said second area of said sieve tray for further dispersed flow therethrough.

2. The apparatus of claim 1 wherein said first area of each of said sieve trays is minor portion of each of said sieve trays and said second area of each of said sieve trays is a major portion of each of said sieve tray.

3. The apparatus of claim 1 wherein said groups of perforations each have substantially the same hole area.

4. The apparatus of claim 1 wherein each said collector-coalescer plate is disposed below its associated sieve tray.

5. The apparatus of claim 1 wherein each said collector-coalescer plate is disposed above its associated sieve tray.

* * * * *